United States Patent [19]

Ogawa et al.

[11] Patent Number: 5,004,716

[45] Date of Patent: Apr. 2, 1991

[54] SYNTHETIC STEVENSITE AND PROCESS FOR PREPARATION THEREOF

[75] Inventors: Masahide Ogawa; Teiji Sato; Masanori Tanaka; Noriyuki Takahashi, all of Niigata, Japan

[73] Assignee: Mizusawa International Chemicals, Ltd., Tokyo, Japan

[21] Appl. No.: 503,300

[22] Filed: Apr. 2, 1990

Related U.S. Application Data

[62] Division of Ser. No. 150,613, Feb. 1, 1988.

[30] Foreign Application Priority Data

Feb. 2, 1987 [JP] Japan .................. 62-20476

[51] Int. Cl.$^5$ ............................ C04B 33/00
[52] U.S. Cl. .................. 501/141; 501/153; 501/154; 423/331
[58] Field of Search .............. 501/141, 153, 154; 423/331

[56] References Cited

U.S. PATENT DOCUMENTS

| 3,586,478 | 6/1971 | Neumann ............... | 501/141 |
| 4,040,974 | 8/1977 | Wright et al. ............ | 423/331 |
| 4,054,537 | 10/1977 | Wright et al. ........... | 423/331 |

FOREIGN PATENT DOCUMENTS

| 13009382 | 7/1982 | Japan . |
| 61-275126 | 12/1986 | Japan . |
| 62-59518 | 3/1987 | Japan . |

OTHER PUBLICATIONS

Brindley, G. W. and Brown, G., *Crystal Structures of Clay Minerals and Their X-Ray Identification*, Mineralogical Society Monograph No. 5, pp. 169-170 (1980).
Grim, R. E., *Structure of the Clay Minerals*, Clay Mineralogy, pp. 83-87 (1968).

*Primary Examiner*—William R. Dixon, Jr.
*Assistant Examiner*—Anthony J. Green
*Attorney, Agent, or Firm*—Spensley, Horn, Jubas & Lubitz

[57] ABSTRACT

Synthetic stevensite composed of stevensite-type sodium magnesium phylosilicate of which metallic components consist essentially of magnesium, sodium and silicon. The synthetic stevensite is characterized by having an X-ray diffraction peak at a spacing of 16 to 26 Å when treated with ethylene glycol. It can be produced by a process comprising hydrothermally treating an aqueous composition containing basic magnesium carbonate and a silica-sodium component selected from the group consisting of (i) sodium silicate, (ii) sodium silicate and amorphous silica, and (iii) amorphous silica and sodium silicate.

4 Claims, 3 Drawing Sheets

SYNTHETIC STEVENSITE AND PROCESS FOR PREPARATION THEREOF

This is a division of application Ser. No. 07/150,613, filed on Feb. 1, 1988.

BACKGROUND OF THE INVENTION

1. Field of the Invention

This invention relates to synthetic stevensite and a process for producing it. More specifically, it relates to synthetic stevensite which is formed of only three metallic components, Mg, Si and Na, has high purity, and is useful as a thickener, an adsorbent, etc., and to a process for producing it.

2. Description of the Prior Art

Synthetic hectorite has been known heretofore as a water-swellable synthetic clay mineral, as described in Japanese Laid-Open Patent Application Nos. 113115/1985 and 197671/1985. Synthetic hectorite contains lithium as a monovalent metallic component and a fluorine ion as an anionic component, and because of the deleterious effect of these components on human and other creatures, is limited in use.

Stevensite is a clay mineral having a chemical composition of the following formula

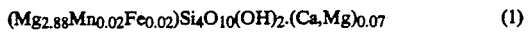

$$(Mg_{2.88}Mn_{0.02}Fe_{0.02})Si_4O_{10}(OH)_2 \cdot (Ca,Mg)_{0.07} \quad (1)$$

This mineral corresponds to a magnesium phyllosilicate [$Mg_3Si_4O_{10}(OH)_2$] in which part of the magnesium component is replaced by another metal and another part of it is left vacant.

Attempts have already been made to synthesize stevensite, and for example, Clays and Clay Minerals, vol. 27, No. 4, pages 253 to 260 (1979) states that hydrothermal treatment of a sepiolite-water system yields stevensite.

As shown by the above formula (1), the naturally occurring stevensite contains colored metallic components such as iron and manganese. Furthermore, the above known synthesis method cannot completely convert sepiolite into stevensite, and has the disadvantage that a considerable amount of sepiolite remains as an impurity in the resulting product.

In the hectorite, part of the magnesium component is replaced only by a lithium atom, and therefore, the arrangement of the atoms becomes regular. Hence, hectorite is susceptible to crystallization.

On the other hand, stevensite is not regular in the arrangement of atoms and is difficult to crystallize because part of the magnesium component is replaced by another atom and part of the remainder is left vacant.

To the best of the knowledge of the present inventors, synthetic stevensite which is composed only of the three metallic components, Mg, Si and Na, and has high purity has not yet been known.

SUMMARY OF THE INVENTION

It is an object of this invention to provide synthetic stevensite which is composed substantially only of three metallic components Mg, Si and Na, and is free from impure metallic components.

Another object of this invention is to provide synthetic stevensite which has excellent whiteness and when dispersed in water or a mixture of water and methanol or ethanol, can form a thickened solution having excellent transparency.

Still another object of this invention is to provide a process for producing the above synthetic stevensite of high purity in high yields.

This invention provides synthetic stevensite composed of stevensite-type sodium magnesium phyllosilicate and having an X-ray diffraction peak at a spacing of 16 to 26 Å when treated with ethylene glycol, the metallic components of said phyllosilicate consisting essentially of magnesium, sodium and silicon.

Preferred synthetic stevensite substantially has a chemical composition represented by the following formula

$$Mg_xNa_ySi_4O_{10}(OH)_2 \cdot Na_z \quad (2)$$

wherein x is a number of at least 2 and y is a number of 0 to 0.1 provided that $x+y<3$, and z is a number of more than 0 but not more than 1.0.

According to this invention, there is also provided a process for producing synthetic stevensite, which comprises hydrothermally treating an aqueous composition containing a basic magnesium carbonate and a silica-sodium component selected from the group consisting of (i) sodium silicate, (ii) amorphous silica and sodium silicate and (iii) amorphous silica and sodium hydroxide.

DETAILED DESCRIPTION OF THE INVENTION

The synthetic stevensite of the invention is similar to hectorite in that it is a magnesium silicate hydrate belonging to smectite. In the synthetic stevensite of the invention, the alkali metal component in the layers is Na, whereas the alkali metal component in the layers of hectorite is Li. A further difference is that in hectorite, the total number of Mg and Li atoms (x+y) in the layers is 3, whereas in the synthetic stevensite of the invention, the total number of Mg and Na atoms (x+y) in the layers is less than 3.

The fact that the total number of Mg and Na atoms in the layers of the synthetic stevensite of the invention is less than 3 shows that some of Mg atoms in the $MgO_6$ octahedral layer are replaced by Na, and some of the rest remain vacant. Furthermore, it is possible further that some other Mg atoms are substituted by hydrogen atoms. To compensate for the lack of the valence charges owing to the replacement of some Mg atoms by Na and to some other Mg atoms remaining vacant, Na ions exist among the stacked layers of a basic layer structure composed of an $SiO_4$ tetrahedral layer/Mg-(Na)$O_6$ octahedral layer/$SiO_4$ tetrahedral layer.

The chemical composition of formula (2) is determined as follows: From the analysis of the composition of the synthetic mineral, the number of Mg atoms (x) and the number of Na atoms (y+z) per four Si atoms are determined. The cations of the synthetic mineral are exchanged with ammonium ions, and by analyzing the composition of the ion-exchanged synthetic mineral, the number of Na atoms (y) present in the layers is determined. Thus, the numbers of atoms (x, y, z) in formula (2) can be determined. In this case, z is the sum of the number of exchangeable Na atoms present among the layers and the number of Na atoms ($\alpha$) simply adhering to the mineral.

In the present invention, x+y is smaller than 3, and preferably not smaller than 2. Within this condition, x is at least 2, preferably 2.6 to 2.8. Furthermore, within the above condition, y is 0 to 0.1, preferably 0 to 0.05. The z value is generally greater than 0 but not more than 1. Theoretically, the cation exchange capacity (z−$\alpha$) is represented by the following formula.

$$z-\alpha=y+2(3-x-y) \tag{3}$$

wherein $\alpha$ represents the number of merely adhering Na atoms.

Figure 1:
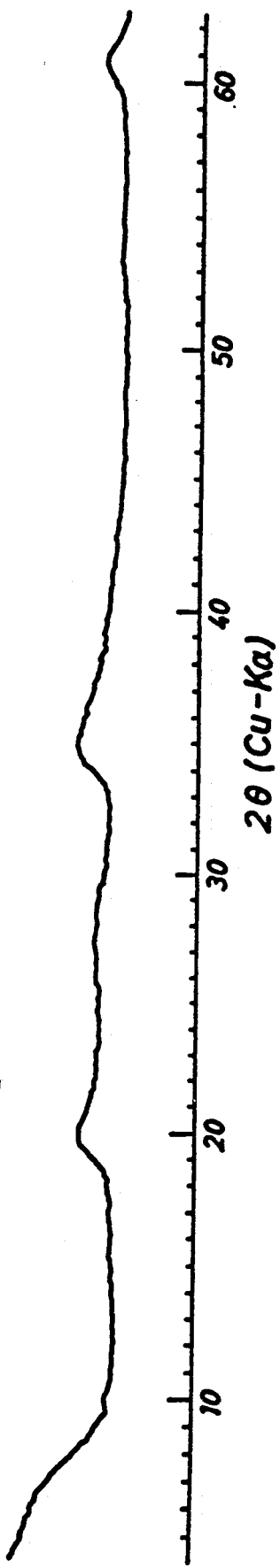
FIG. 1 is an X-ray diffraction spectral chart of the synthetic stevensite obtained in Example 1 of the invention taken by using Cu-Kα rays.

The synthetic stevensite of this invention shows an X-ray diffraction pattern inherent to a smectite clay mineral. FIG. 1 of the accompanying drawings is an X-ray diffraction pattern of the synthetic stevensite of the invention.

Figure 2:
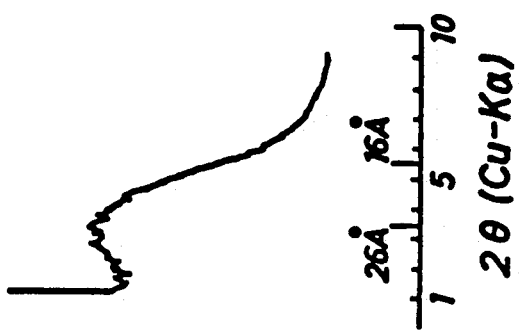
FIG. 2 is an X-ray bottom reflection spectral chart, taken by using Cu-Kα rays, of the synthetic stevensite obtained in Example 1 of the invention and treated with ethylene glycol.

In the case of smectite and a smectite-containing mixed layer mineral treated with ethylene glycol, the X-ray bottom surface reflection appears at 16 to 26 Å. The synthetic stevensite of this invention has this characteristic as shown in FIG. 2.

Figure 3:
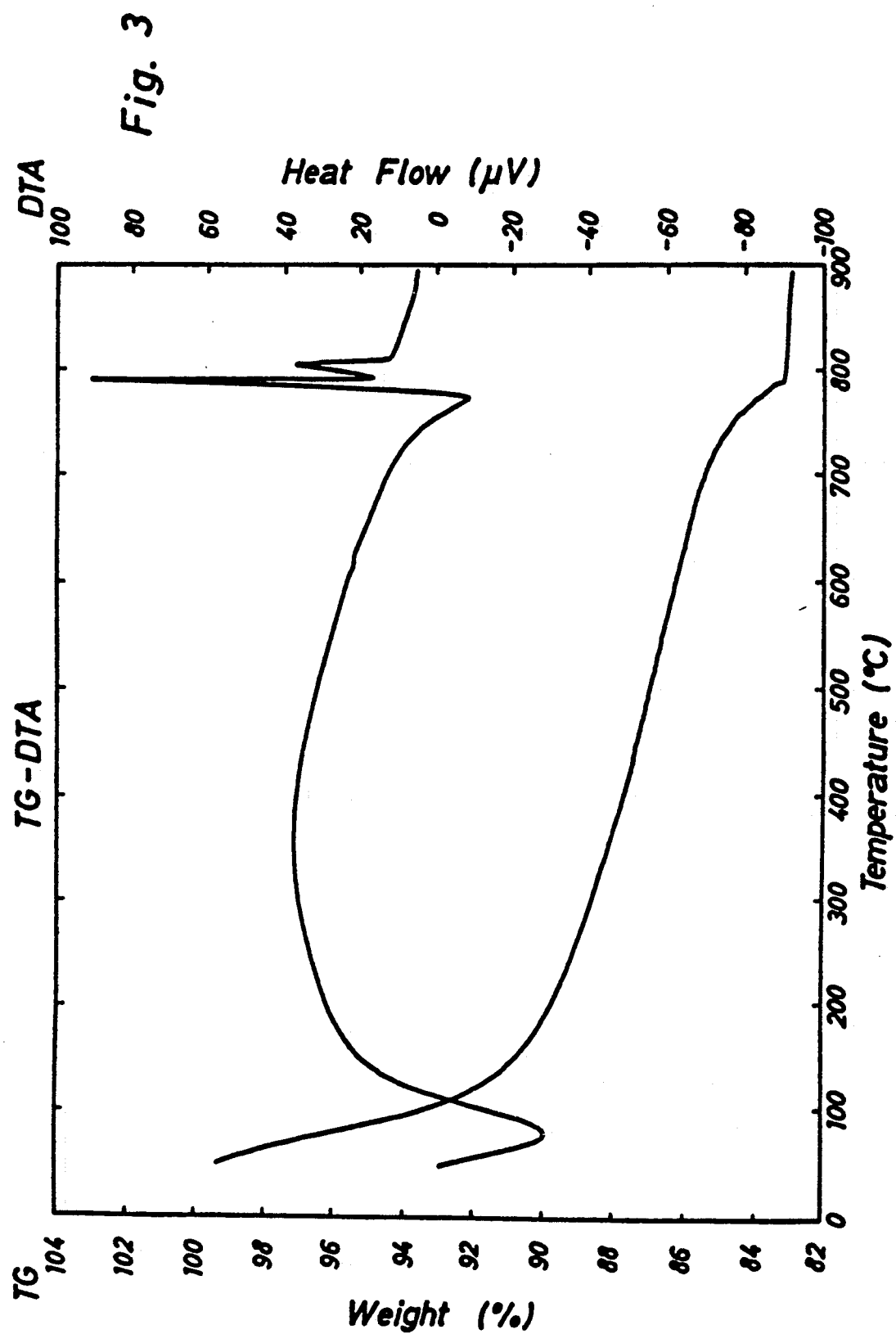
FIG. 3 is a thermal analysis curve of the synthetic stevensite obtained in Example 2 of the invention.
Figure 4:
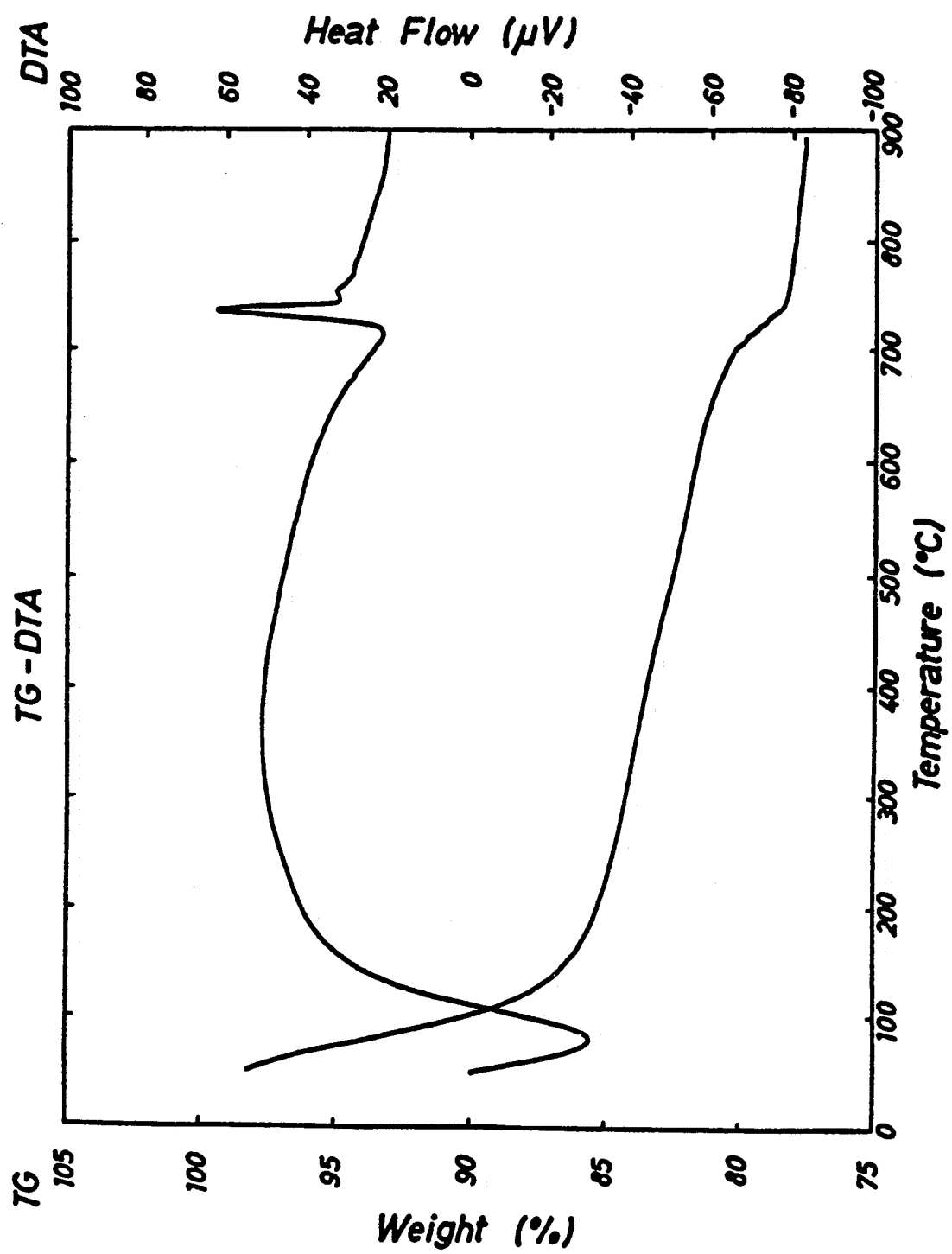
FIG. 4 is a thermal analysis curve of synthetic hectorite (RAPONITE XLG made by RAPORTE CO., LTD.)

The synthetic stevensite of this invention shows a maximum exothermic peak at 755° to 820° C. in differential thermal analysis, whereas synthetic hectorite has a maximum exothermic peak at 700° to 750° C. FIGS. 3 and 4 are differential thermograms of the synthetic stevensite of the invention and synthetic hectorite (RAPONITE XLG produced by RAPORTE CO., LTD.).

The synthetic stevensite of the invention is obtained in a form free from impure metallic components. It is generally a white powder having a Hunter whiteness degree of at least 80%, preferably at least 90%.

The synthetic stevensite has a cation exchange capacity in the range of generally 0.20 to 1.50 meq./g, particularly 0.2 to 1.0 meq./g. Because of this cation exchange capacity, the synthetic stevensite of this invention can be used as an ion exchange material for various cations or an ionic adsorbent for cationic substances.

The synthetic stevensite of the invention has a relatively large specific surface area as a characteristic of a fine layer-like compound. It has a BET specific surface area of generally 200 to 500 m²/g, preferably 350 to 450 m². By utilizing this property, the synthetic stevensite of this invention can be used as an adsorbent for dyes and malodorous components and is also expected to be used as a catalyst carrier.

Furthermore, the synthetic stevensite of the invention gets swollen with water and alcohols such as methanol, ethanol and glycerol to give transparent thick solutions. Since the synthetic stevensite of the invention has no metallic components and anions which are considered toxic and has a high purity, it is useful as a thickening agent, a swelling agent, an emulsification stabilizer, a caking agent, a gel base or a molding agent for cosmetics, pharmaceuticals, foodstuffs, household goods, agricultural goods and ceramic articles.

According to the process of this invention, the synthetic stevensite can be produced by hydrothermally treating an aqueous mixture containing basic magnesium carbonate and sodium silicate or a combination of amorphous silica and sodium hydroxide.

Selection of basic magnesium carbonate as a magnesium material enables synthesis of stevensite in high purity and yield. Any desired grade of basic magnesium carbonate may be used. If, however, magnesium carbonate, magnesium hydroxide, or a mixture of both is used, it is impossible to produce stevesite of high purity in high yields. Hydromagnesite is especially desirable as the basic magnesium carbonate. It has a chemical composition of the following formula $$4MgCO_3 \cdot Mg(OH)_2 \cdot 4H_2O \tag{4}$$

It also has an X-ray diffraction pattern assigned to ASTM No. 25-513.

An aqueous solution of sodium silicate is advantageously used as a material for the Si and Na components. A combination of amorphous silica and sodium silicate and a combination of amorphous silica and sodium hydroxide may also be used. Sodium silicate having the following formula $$nSiO_2 \cdot Na_2O \tag{5}$$

wherein n is a number of 1 to 5, preferably 2.0 to 3.5, may be used. Amorphous silica may be, for example, silica hydrosol, silica hydrogel, silica xerogel, wet-method amorphous silica or vapor phase-method amorphous silica.

The proportions of basic magnesium carbonate and sodium silicate or a combination of amorphous silica and sodium hydroxide may preferably be such that the amounts of the magnesium component and the silicate component are substantially stoichiometric and the amount of the sodium component is greater than the stoichiometric amount. When sodium silicate is used, the sodium component exists in excess in the system without particularly adding sodium hydroxide.

Prior to the hydrothermal reaction, the raw materials used are mixed as uniformly as possible to form a homogeneous aqueous slurry. This is desirable in view of the increase of yield and purity. The homogeneous mixing is preferably carried out with stirring under a strong shear. For this purpose, a high-speed shear mixer, a ball mill, a sand mill, a colloid mill, and ultrasonic radiation may, for example, be used.

A small amount of sodium silicate acts effectively to disperse the basic magnesium carbonate uniformly in aqueous solution. Hence, when sodium silicate is used as a material, uniform mixing can be achieved by first dispersing the basic magnesium carbonate with sodium silicate to prepare a slurry, and then adding the remaining material to the slurry. Sodium silicate in this case may be used in an amount of 0.01 to 10% by weight based on the aqueous slurry. Desirably, the solids concentration of the aqueous mixture is generally in the range of 1 to 30% by weight, preferably 5 to 15% by weight.

The uniform mixture is fed into an autoclave and hydrothermally treated. The hydrothermal treatment conditions may be milder than those used in the prior art. For example, it is preferably carried out at a temperature of 100° to 300° C., more preferably 150° to 200° C., under a pressure of 0 to 100 kg/cm²·G, preferably 6 to 40 kg/cm²·G. The reaction time is generally on the order of 0.5 to 20 hours. The synthetic stevensite obtained by the reaction is separated from the mother liquor by a solid-liquid separating procedure, washed with water, and dried to obtain a final product.

The present invention has for the first time provided synthetic stevensite composed substantially only of three metallic components, Mg, Si and Na, and being free from impure metallic components. Furthermore, according to this invention, synthetic stevensite of high purity can be synthesized in high yields under relatively mild hydrothermal reaction conditions using inexpensive easily available raw materials.

The following Examples illustrate the present invention.

The various tests in the following Examples were conducted by the following methods.

1. X-ray diffractometry

X-ray diffractometry was conducted by using an X-ray diffraction device of Rigaku Denki Co., Ltd. (X-ray generating device 4036A1, goniometer 2125D1, counter device 5071).

The diffraction conditions were as follows:
Target: Cu
Filter: Ni
Detector: SC
Voltage: 35 kVP
Current: 15 mA
Count full scale: 8000 c/s
Time constant: 1 sec.
Scanning speed: 2°/min.
Chart speed: 2 cm/min.
Radiation angle: 1°
Slit width: 0.3 mm
Glancing angle: 6°

2. X-ray diffraction of a sample treated with ethylene glycol

The sample (1.0 g) dried at 110° C. for 2 hours was taken, and 5 ml of a 10% aqueous solution of ethylene glycol was added to it by a whole pipette. The mixture was well stirred by a stirrer, and then dried at 60° C. for 12 hours. The dried product was crushed by an agate mortar, and the resulting powder was subjected to X-ray diffractometry under the following conditions.

a. Conditions of X-ray diffraction
Target: Cu
Filter: Ni
Detector: SC
Voltage: 40 kVP
Current: 20 mA
Count full scale: 2000 c/s
Time constant: 2 sec
Scanning speed: 1°/min.
Chart speed: 1 cm/min.
Radiation angle: 1/6°
Slit width: 0.3 mm
Glancing angle: 6°
Diffraction angle range measured: 1°–9° ($2\theta$)

The spacing (d) is calculated in accordance with the following equation (6) from the diffraction angle ($2\theta$) determined from the mid-point of the half-value width.

$$d = (\lambda/2) \sin^{-1}(\theta) \quad (6)$$

where $\lambda$ is the wavelength of X-ray which is 1.542 Å.

3. Analysis of the composition

The sample dried at 110° C. was analyzed for $SiO_2$ by gravimetry, for MgO by chelate titrimetry, and for $Na_2O$ and $Li_2O$ by flame photometry.

With regard to $Na_2O$ and $Li_2O$ in the layers, the exchangeability of a sample fully swollen with water was determined. With regard to a sample obtained by washing away the adhering cations with a 1N aqueous solution of ammonium acetate, washing it and then drying it at 110°, the concentrations of $Na_2O$ and $Li_2O$ were measured.

4. Thermal analysis

This analysis was conducted by using a differential thermal balance (standard type TG-DTA 8078G1) made by Rigaku Denki Co., Ltd. The measuring conditions were as follows:
Sample weight: 15 mg
DTA range: 100 $\mu V$
Temperature elevating rate: 10° C./min.
Atmosphere: air

EXAMPLE 1

To 400 ml of water were added 25.6 g of commercial basic magnesium carbonate (TT made by Tokuyama Soda Co., Ltd.) and 108.0 g (24 g as silica) of No. 3 sodium silicate, and they were mixed for 3 minutes in a household mixer. Water was added to the mixture to adjust its total amount to 600 ml. It was put in a 1-liter autoclave, and while it was stirred with a stirrer, carbon dioxide gas was blown into it. When the mixture lost flowability, the blowing of carbon dioxide gas was stopped. The mixture was then hydrothermally treated at 180° C. for 3 hours, and cooled gradually. The treated product was filtered, washed with water, and dried to give 36.2 g of the product.

Analysis of the composition of this product showed that x, y and z in general formula (2) were as follows.
$x = 2.698$
$y = 0.014$
$z = 0.777$ Samples (0.5 g) of the above dried product were respectively taken into 50 ml. sample bottles and 25 ml of water, 25 ml of 80% methanol solution and 25 ml 40% glycerol solution were respectively added. The bottles were occasionally shaken to produce a transparent hydrogel, and alcoholic gels respectively. When these bottles were gently caused to fall down, the uniform gels in the bottles did not flow.

EXAMPLE 2

Commercial basic magnesium carbonate ("Kinboshi", a product of Kounoshima Chemical Co., Ltd.; 25.6 g) and 546.2 g (24 g as silica) of silica hydrogel (MIZUKASORB ®, a product of Mizusawa Chemical) were put in a household mixer, and mixed for 3 minutes. To the mixture were added an aqueous solution of sodium hydroxide (2.7 g as sodium hydroxide) and water to adjust the amount of the solution to 800 ml. It was put in a 1-liter autoclave, and with stirring, hydrothermally treated at 175° C. for 3 hours. Gases evolved during the process were occasionally removed. The autoclave was gradually cooled, and the contents were taken out, filtered, and dried to obtain 38.9 g of the product.

The composition of the product was analyzed, and x, y and z ingeneral formula (2) were found as follows.
$x = 2.67$
$y = 0.01$
$z = 0.65$ As in Example 1, this product became a transparent gel in water and alcohol solutions and showed the same characteristics as described in Example 1.

EXAMPLE 3

Commercial basic magnesium carbonate (TT, a product of Tokuyama Soda Co., Ltd.; 1,077 g) (430 g as magnesia) was put in about 4 liters of water, and 1,186 g (264 g as silica) No. 3 sodium silicate was added. The mixture was stirred to prepare a slurry. Then, 21,068 g (697 g as silica) of silica hydrogel (MIZUKASORB ®) produced by Mizusawa Chemical Co., Ltd.) was stirred and the slurry was added dropwise to it to form an aqueous slurry.

The aqueous slurry was put in a 40-liter autoclave, and with stirring, hydrothermally treated at 170° C. for 5 hours. Gases evolved during the process were occasionally removed. The autoclave was cooled gradually, and the contents were taken out, filtered and dried to give 1,617 g of the product.

Analysis of the composition of the product showed that x, y and z in general formula (2) were as follows.

$x = 2.809$
$y = 0.047$
$z = 0.430$

As in Example 1, this product became a transparent hydrogel in water, and showed the characteristics described in Example 1.

What is claimed is:

1. A process for producing synthetic stevensite, which comprises hydrothermally treating a fluorine-ion-free aqueous composition containing as metallic components only basic magnesium carbonate and a silica-sodium component selected from the group consisting of (i) sodium silicate, (ii) sodium silicate and amorphous silica, and (iii) amorphous silica and sodium hydroxide, the solids concentration of the aqueous composition being 5 to 15% by weight, the hydrothermal treatment being carried out at a temperature of 100° to 300° C. under a pressure of 0 to 100 kg/cm$^2$·G, and the resulting synthetic stevensite being non-toxic to humans.

2. The process of claim 1 wherein the basic magnesium carbonate is hydromagnesite.

3. The process of claim 1 wherein the magnesium component and the silica component are used in substantially stoichiometric proportions.

4. The process of claim 1 wherein the hydrothermal treatment is carried out at a temperature of 150° to 200° C. under a pressure of 6 to 40 kg/cm$^2$.

* * * * *